United States Patent
Bryan et al.

[11] Patent Number: 5,243,633
[45] Date of Patent: * Sep. 7, 1993

[54] BORATE GLASS CONTAINING BORON CARBIDE BURNABLE POISON COATING

[75] Inventors: William J. Bryan, Granby; Nathan Fuhrman, Plainville, both of Conn.; David C. Jones, Austin, Tex.

[73] Assignee: Combustion Engineering, Inc., Windsor, Conn.

[*] Notice: The portion of the term of this patent subsequent to Feb. 5, 2008 has been disclaimed.

[21] Appl. No.: 763,044

[22] Filed: Sep. 20, 1991

[51] Int. Cl.$^5$ .................................................. G21C 3/00
[52] U.S. Cl. ..................... 376/419; 376/457; 376/416; 376/414
[58] Field of Search ............... 376/419, 457, 416, 155, 376/414; 976/DIG. 52, DIG. 283; 252/634; 427/266, 419.7

[56] References Cited

U.S. PATENT DOCUMENTS

| | | | |
|---|---|---|---|
| 3,274,066 | 9/1966 | Zumwalt | 55/385.1 |
| 4,566,989 | 1/1986 | Radford et al. | 252/478 |
| 4,587,087 | 5/1986 | Radford et al. | 376/417 |
| 4,762,675 | 8/1988 | Feild, Jr. | 376/414 |
| 4,880,597 | 11/1989 | Bryan et al. | 376/419 |
| 4,990,303 | 2/1991 | Bryan et al. | 376/419 |
| 5,171,520 | 12/1992 | Bryan et al. | 376/444 |

*Primary Examiner*—Donald P. Walsh
*Assistant Examiner*—Meena Chelliah
*Attorney, Agent, or Firm*—John H. Mulholland

[57] ABSTRACT

A fuel element (10) for a nuclear reactor having a zirconium-tin alloy cladding tube (20), with a thin coating (30) of a burnable poison consisting of an enriched boron particles sealed in a boron-containing glass or glass compound deposited from a liquid sol-gel.

2 Claims, 1 Drawing Sheet

BORATE GLASS CONTAINING BORON CARBIDE BURNABLE POISON COATING

BACKGROUND OF THE INVENTION

This invention is an improved nuclear fuel element incorporating a burnable poison. The poison would be contained in a thin layer of glass on the inside of the fuel rod cladding. This is a specific improvement in the invention disclosed and covered by U.S. Pat. No. 4,990,303, issued Feb. 5, 1991, to the same joint inventors and assigned to the same assignee.

The invention relates to nuclear fuel elements and, in particular, fuel elements with a burnable poison coating in the form of a thin layer of boron carbide. The boron carbide coating contains the boron-10 burnable poison isotope and is composed of particles sealed to the nuclear fuel element tube wall with an alkali metal borate glass deposited on the inside of the zirconium alloy cladding tube by sol-gel technology.

A nuclear fuel element of the type involved in the invention is part of a fuel assembly. Heretofore, typically fuel assembly designs have employed fixed lattice burnable poison rods to control early-in-life reactivity and power peaking. These rods have become a necessary design feature for the fuel management of first cores of light water reactors as well as in schemes to achieve extended burnups and reduced radial neutron leakage. Such rods displace fuel rods within the assembly lattice which increases the core average linear heat generation rate and local peaking factors. Alternate approaches have been proposed that place burnable poison material inside the fuel rods so that much less fuel material is displaced, for example, as boride coatings on the $UO_2$ pellets. Such coatings, however, while adhering when first applied, tend to spall off under the stresses of the irradiation environment in the nuclear reactor core, in part because of difficulty in matching the thermal expansion behavior of the coating to that of the fission material or $UO_2$ pellet. Attempts to incorporate boron compounds as mixtures within the $UO_2$ pellets have not been successful because of volatilization of boron species during high temperature fabrication processes and redistribution of the boron under irradiation.

The invention involves an improved fuel element with a burnable poison coating which substantially overcomes problems of spalling and coating integrity because of the closely matched thermal expansion coefficients of the substrate and coating material and the action of fission sintering to enhance adhesion of the coating to the substrate.

In the above referenced patent (U.S. Pat. No. 4,990,303), a sol-gel derived glass containing boron-10 was disclosed. The glass could be applied to form a dense, adherent, abrasion-resistant coating on the inside zircaloy tubes at temperatures below 400° C. Although the glass technically met all the requirements for a burnable poison, the application procedure was complicated and not desirable for large scale production. Specifically, the glass had to be applied in successive layers and each layer cured in order to achieve good adhesion. A one-step process for applying the boron-10 coating is more desirable.

For further background, see U.S. Pat. Nos. 3,925,151; 4,372,817; 4,560,575; 4,566,989; 4,582,676; 4,587,087; 4,587,088; 4,636,404; 4,824,634; 4,880,597; and 4,990,303.

SUMMARY OF THE INVENTION

After the feasibility of applying a dense glass coating at less than 400° C. had been demonstrated, by the inventors, it occurred to them that such a glass could be loaded with boron carbide particles to increase the boron-10 content of the coating while decreasing the amount of glass necessary to form a stable coating. The boron carbide particles would be glued in place by the glass with a relatively small amount of glass needed to bond the particles to the tubing surface and to each other.

The boron-10 is added in the form of boron carbide $B_4{}_{10}C$, i.e., fully enriched in boron-10. The glass is a borosilicate which could use either natural boron or enriched boron-10. In either case, a stable glass would be achieved; i.e., conversion of the boron-10 to lithium-7 by neutron absorption would not destroy the mechanical integrity of the glass.

DETAILED DESCRIPTION OF THE INVENTION

Figure 1:
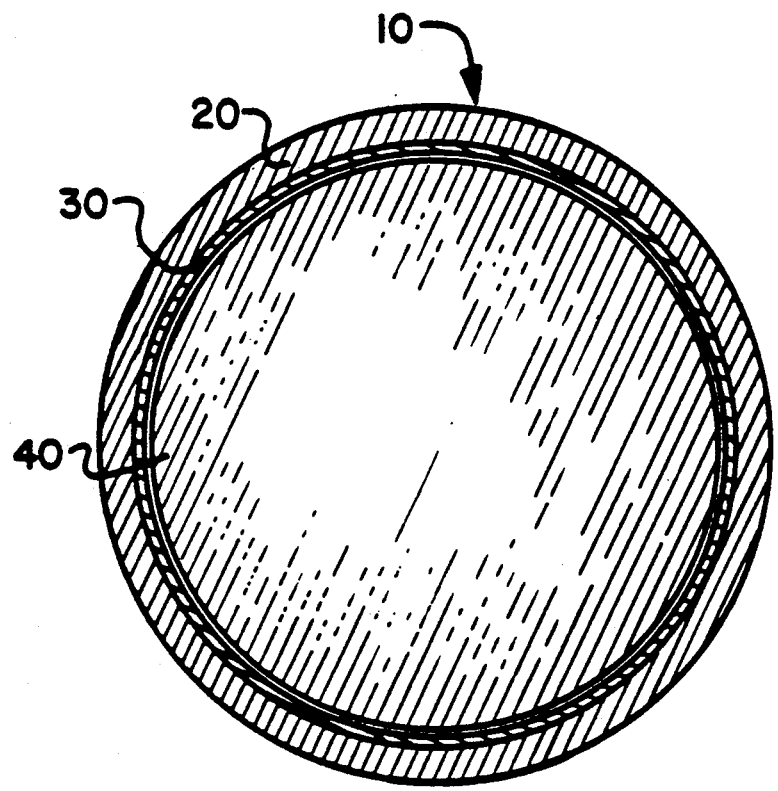
FIG. 1 is a cross-sectional view of a fuel element with a burnable poison coating made according to the principles of the invention.

The numeral 10 generally indicates a fuel element constructed according to the principles of the invention for use in a nuclear reactor. The fuel element includes a zirconium-tin alloy cladding tube 20, a boron-containing glass compound coating 30 on the inside of the zirconium-tin alloy cladding tube and pellets 40 of fissionable materials such as $UO_2$.

Assuming a ⅜-inch internal diameter nuclear fuel element tube, and a two milligram-per-linear-inch loading of boron-10, it can be readily calculated that a solid layer of boron carbide on the tube would have to be 1.44 microns in thickness (25 microns equals 0.001 inches). Since the boron carbide will be added as particles mixed into a glass, the coating 30 thickness will be greater than 1.44 microns. Based on previous work where metal particles were loaded into a glass and applied as a coating, the inventors have determined that stable coatings could be achieved with glass which comprised 20% of the coating by weight, and 33% by volume. Taking a more conservative estimate of 50% by volume, a coating approximately 2.88 microns in thickness would be required.

Boron carbide has several properties which make it attractive as an additive to form such a coating. It is a very inert material in both a thermal and a chemical sense. Its hardness provides excellent abrasion resistance. The thermal expansion of boron carbide is $45 \times 10^{-7}/°$ C. This matches quite well with the expansion of the zircaloy tubes which are approximately $50 \times 10^{-7}/°$ C. Boron carbide highly enriched in boron-10 is readily available in the U.S. and in other countries.

It is anticipated that adhesion between the glass which, for example, could be ($Li_2O.4B_2O_3$) and the boron carbide even when irradiated, will be good. The excellent adhesion of the glass to the metal has already been demonstrated in work done during development of the earlier invention of U.S. Pat. No. 4,990,303.

It is contemplated that the best way to apply coating 30 to a fuel tube 20 would be to place an appropriate amount of the boron carbide powder and viscous glass solution along the length of the tube. The tube 20 would then be spun at a high velocity to distribute this material evenly throughout the interior. While still spinning the tube, the tube 20 would be heated, first to drive off the volatile species and complete the hydrolysis of the metal alkoxides, and then heated to a higher temperature to sinter the glass. It is envisioned that air would be blown through the tube during the heating process to carry away the volatile species. After the glass was fully cured, the temperature would be lowered and the tube removed from the apparatus.

The sol-gel chemistry for applying and curing the glass coating is defined in U.S. Pat. No. 4,990,303. Work in developing that invention evaluated the types of precursor alkoxides, solvents, catalysts, drying rates, and sintering temperatures required to apply a sol-gel successfully. This technology can be incorporated with little change into this application, with care to select an appropriate viscosity when mixing in the boron carbide powder.

A suitable ratio of boron carbide to glass will be obtained through simple repetitive empirical testing. It is desirable for the final coating to be as thin as possible, while still maintaining the proper content of boron-10. Thin coatings are more tolerate of thermal shock and will also yield the lowest cost for the materials constituting the burnable poison coating 30.

We claim:

1. In a fuel element for use in a nuclear reactor which includes a fissionable material contained within a zirconium-alloy cladding tube, the improvement which comprises a burnable poison coating on the inside of the zirconium-alloy cladding tube, said coating consisting of a glass compound containing boron or boron carbide particles deposited from a sol-gel solution.

2. The fuel element of claim 1 in which the coating's boron-containing compound and particles include boron enriched in the boron-10 isotope to give a desired nuclear poison level for use in the nuclear reactor.

* * * * *